United States Patent [19]

Fukushima et al.

[11] Patent Number: 5,576,502

[45] Date of Patent: Nov. 19, 1996

[54] POINTING UNIT AND IMPROVED STYLUS PEN

[75] Inventors: Yasuyuki Fukushima; Minoru Wakabayashi, both of Otone-machi, Japan

[73] Assignee: Wacom Co., Ltd., Japan

[21] Appl. No.: 529,545

[22] Filed: Sep. 18, 1995

[30] Foreign Application Priority Data

Jun. 6, 1995 [JP] Japan .................................. 7-162866

[51] Int. Cl.⁶ .................................................. G08C 21/00
[52] U.S. Cl. ............................................ 73/862.68; 178/18
[58] Field of Search ................... 73/862.041, 862.541, 73/862.69, 865.7; 364/709.11; 178/18

[56] References Cited

U.S. PATENT DOCUMENTS

| | | | |
|---|---|---|---|
| 4,878,553 | 11/1989 | Yamanami et al. | 178/18 |
| 4,988,837 | 1/1991 | Murakami et al. | 178/18 |
| 5,134,689 | 7/1992 | Murakami et al. | 178/19 |

FOREIGN PATENT DOCUMENTS

5275283  10/1993  Japan .

*Primary Examiner*—Richard Chilcot
*Assistant Examiner*—Ronald Biegel
*Attorney, Agent, or Firm*—Joseph W. Berenato, III

[57] ABSTRACT

The invention relates to a pointing unit adapted for a stylus pen associated with a coordinate data input device which has been commonly used as one of some input devices for a computer system. This pointing unit comprises a casing formed in a substantially cylindrical shape; a support member installed in the interior of the casing, the support member being limited to move in the reverse direction of one end opening of the casing; a cap member formed in the same cylindrical shape as the casing, the external diameter of the cap member being slightly smaller than the internal diameter of the casing, one end of the cap member being formed in a dome shape and arranged close to the end opening so as to protrude a predetermined length of the dome shape end from the end opening of the casing, the cap member being limited to move in the outward direction and on the contrary freely sliding in the inward direction; a core member made of magnetic material arranged close to the inner surface of the dome shape end of the cap member; a coil member made of magnetic material, interposed between the core member and the support member; and an elastic member arranged in a narrow space defined between the coil member and the inner surface of the dome shape end of the cap member to urge the cap member outward in the reverse direction with respect to the coil member so that the dome shape end of the cap member is protruded some length from the opening end of the casing.

13 Claims, 8 Drawing Sheets

POINTING UNIT AND IMPROVED STYLUS PEN

BACKGROUND OF THE INVENTION

1. Field of the Invention

The present invention relates generally to a pointing unit included in a pointing device such as a stylus pen associated with a coordinate data input device such as a digitizer or tablet which has been commonly used as one of many input devices for a computer system. Especially, the present invention relates to improvement in the pressure sensitive mechanism of a stylus pen and a stylus pen including the pressure sensitive mechanism.

2. Description of the Prior Art

Conventional stylus pens (hereinafter, referred to as "pen") used as a pointing device for a digitizer have been constituted for detecting pen-down information in additon to coordinate information on the pointing device. Such pen-down information represents one specific condition of a pen point of the stylus pen being in contact with a panel of the digitizer. The pen-down information is detected by pressure sensitive means for detecting the vertical pressure applied to the pen point.

As a typical point detecting system for a digitizer, an electromagnetic signal utilizing system has been commonly used. This system comprises a sensor panel including a plurality of sensor coils arranged parallel to the detecting direction, and a pointing device such as a pen or a cursor. Since the pointed place is represented by X and Y coordinates, the detecting area of the sensor panel is composed of two sections intersected perpendicularly to X and Y directions. The pointing device is provided with a coil or resonant circuit to perform electromagnetic interaction between the pointing device and the sensor coils. A typical detecting operation of such constitution will be explained. These sensor coils in the sensor panel transmit an electromagnetic wave and then receive a response electromagnetic wave re-emitted by the interaction between the transmitted electromagnetic wave and the resonant circuit in the pointing device. The coordinate values of the pointing device are produced by arithmetic operation according to a main sensor signal generating the strongest electromagnetic energy and supplemental sensor signals adjacent to the main sensor.

Such a constituted electromagnetic signal utilizing system provides some advantageous features, one of which allows the pointing device to be used without a connection lead; i.e., cordless and free from a power source such as a battery. The applicant of the present invention has already provided various digitizers according to this electromagnetic signal utilizing system as shown in Japanese Patent Publication No. 2-53805/1990 and Japanese Patent Application Open-Publication No. 3-147012/1991.

Further various modified detecting systems are known. For example, a sensor panel transmits an electromagnetic wave and a pointing device receives this electromagnetic wave. Reversely, a pointing device transmits an electromagnetic wave and a sensor plate receives the transmitted signal.

In these systems utilizing electromagnetic mutual function, a pointing device includes a coil or resonant circuit. Furthermore, a stylus pen type pointing device may be provided with a pen pressure sensing function to sense pen pressure, and/or on-off switching mechanism to input switching information at a required position. In such a type of stylus pen, the pressure sensing function and the switching mechanism are performed by changing the resonant condition from normal position of the coil or resonant circuit.

Therefore, various types of stylus pens having such pen pressure sensing function have been proposed. For example, such a pen pressure sensing mechanism is provided by replacing a part of the capacitor or coil of the above described resonant circuit with a variable capacitor or variable coil, or adding a variable resistor to the resonant circuit. These variable elements are easily varied in response to the pen pressure. Such a pen pressure sensing type stylus pen is disclosed in Japanese Patent Application Open-Publications No. 63-257823/1988, No. 64-53223/1989, No. 4-96212/1992, and No. 5-275283/1993.

Figures 1A, 1B:
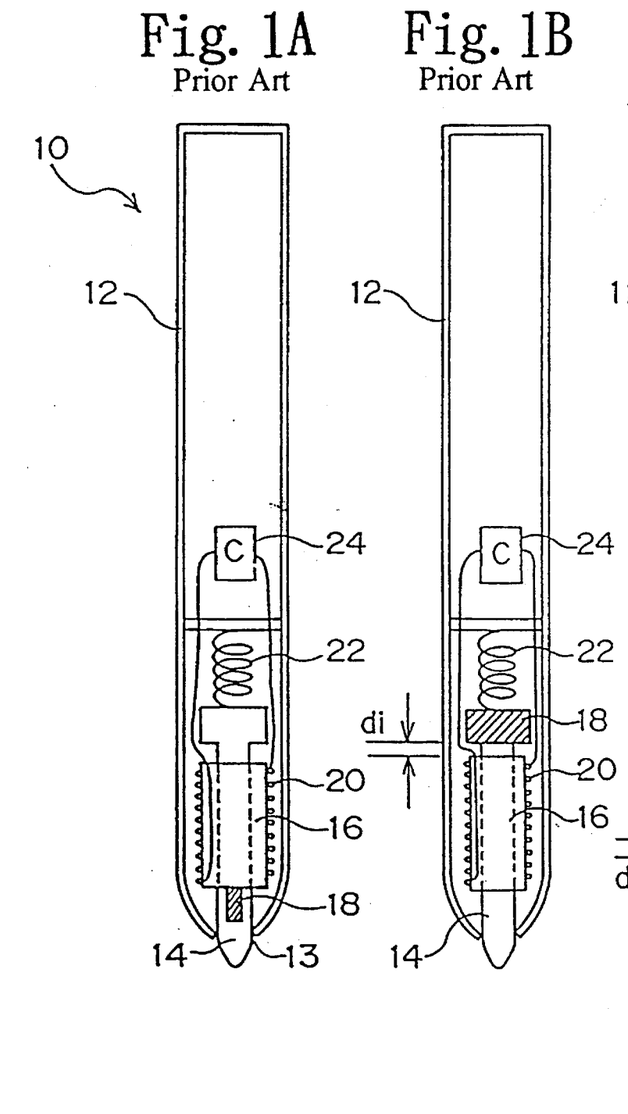
FIG. 1A to FIG. 1C are schematic sectional views showing three typical structures of conventional stylus pen.
Figure 1C:
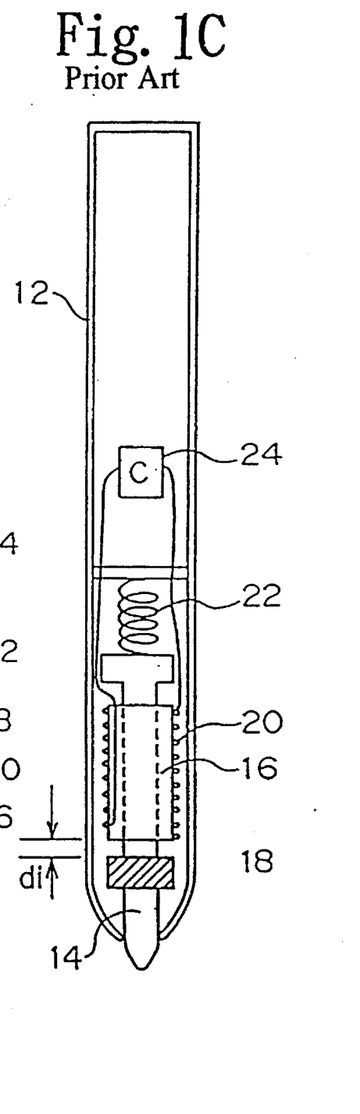

FIG. 1A to FIG. 1C show conventional stylus pens, known as L (inductance) variable type stylus pen, including the resonant circuit for detecting pen pressure.

These three stylus pens include the same components such as an external casing 12, as a pen holder, formed in a cylindrical shape, a core member 14 arranged on the axis of the external casing 12, a core support member 16 composed of a ferrite core with a through hole in which the core member 14 is slidably supported, a coil 20 wound around the circumferential surface of the ferrite core 16, a movable magnetic member 18 capable of moving with respect to the ferrite core, an elastic member or coil spring 22, and a capacitors 24. The core member 14 is formed in a substantially cylindrical shape with a tapered end, as a pen point, to facilitate pointing operation by contact between the tapered end and a sensor plate. Although these stylus pens may be provided with additional members such as a switching unit and the like, such additional members are not shown. In these stylus pens, the ferrite core 16 is fixed to the external casing 12 so that the core member 14 can be moved upwards in the axis of the external casing 12 when the pen point is pressed on a sensor plate (this operation is referred to "pen down"). In these stylus pens, a movable magnetic member 18 is associated with the core member 14 so that the movable magnetic member 18 can be integrally moved with the movement of the core member 14. In detail, the stylus pen shown in FIG. 1A includes a movable magnetic member 18 fixed to the side surface of the core member 14, thereby allowing integral movement. The stylus pen shown in FIG. 1B includes a movable magnetic member 18 fixed at the rear end of the core member 14. The stylus pen shown in FIG. 1C includes a movable magnetic member 18 surroundingly assembled on the front section of the ferrite core 16.

In such constituted stylus pens, as the movable magnetic member 18 is moved by the pen down operation, the distance defined between the movable magnetic member 18 and the ferrite core 16 will be also varied. In FIG. 1B and FIG. 1C, "di" represents an initial distance between the movable magnetic member 18 and the ferrite core 16 when the stylus pen is free from pen down pressure. On the other hand, the coil 20 and the capacitor 24 constitute a resonant circuit. The resonance conditions for this resonant circuit are determined so as to make resonance with the electromagnetic wave transmitted to and received from sensor coils. In other words, inductance of the coil 20 depends on the distance between the ferrite core 16 and the movable magnetic member 18. As a result, any pen down operation can be detected by watching change in the resonance conditions.

The elastic member 22 is not only limited to a coil spring, but an elastic rubber may be also used.

Furthermore, another modified stylus pen provided with an eraser function in addition to the above described functions is known. Still another modified stylus pen equipped with two different pen points having different functions at both ends has been provided to aim at increasing the information capacity to be input through the stylus pen. However, these modified stylus pens must reduce the dimension of the pen pressure sensitive mechanism because the whole length of the stylus pen is limited to a specific length, for example 140 mm, owing to the view point of the design. In the stylus pen provided with a pen unit at one end and an eraser unit at the other end, it is desirable to set the center of gravity at the pen unit's side to facilitate operator working. Therefore, it is preferable to reduce the weight and length of the eraser unit or the second pen point as much as possible.

The above described conventional stylus pens having the pen pressure sensitive structures shown in FIG. 1A to FIG. 1C can not be sufficiently minimized because the coil spring of the pen pressure sensitive unit requires a relatively long stroke space. Even if the coil spring is replaced by an elastic rubber, greater space will be required to provide a light pen pressure characteristic. Furthermore, since the hardness of the rubber member is required to be smaller to provide a light pen pressure characteristic, the rubber member will be deformed greatly owing to the compressive permanent set of the rubber member itself.

BRIEF SUMMARY OF THE INVENTION

It is therefore an object of the present invention to provide a light and compact sized eraser unit or pointing unit for a second pen unit of a pressure sensitive type stylus pen.

Another object of the present invention is to provide an improved stylus pen which includes a pressure sensitive unit and a light and compact sized eraser unit or pointing unit used as a second pen unit.

To accomplish the above described objects, a pressure sensitive type stylus pen according to the present invention is characterized by the following compositions.

In the first aspect of the present invention, a pointing unit adapted for a stylus pen, comprises:

a casing formed in a substantially cylindrical shape;

a support member installed in the interior of the casing, the support member being limited to move in the reverse direction of the opening end of the casing;

a cap member being located close to the opening end of the casing and formed in a cylindrical shape with a dome shape end protruding in the outward direction of the opening end by a predetermined length therefrom and the external diameter being slightly smaller than the internal diameter of the casing, the cap member being limited to move from the predetermined position in the outward direction of the opening end and on the contrary movable freely sliding in the inward direction;

a magnetic member made of magnetic material, arranged close to the inner surface of the dome shape end of the cap member;

a coil member including a magnetic core, interposed between the core member and the support member; and an elastic member arranged in a narrow space defined between the coil member and the inner surface of the dome shape end of the cap member to urge said cap member in the outward direction with respect to the coil member so that the dome shape end of the cap member is defined at the predetermined position protruding some length from the opening end of the casing.

The positioning unit may further comprise a capacitor electrically connected to the coil member; the capacitor and coil member constitute a resonant circuit whose oscillating state is varied in response to the inward movement of the cap member against the urging force by the elastic member.

The positioning unit may be capable of performing a positioning operation on a sensor plate including multiple sensor coils arranged parallel to each coordinate axial direction of a coordinate data input device through the dome shape end of the cap member.

The cap member may include a support pin which is protruded inwardly from the inner surface of the dome shape cap end in the axial direction of the cap member, and the magnetic member formed in an annular shape through which the support pin is inserted, the support pin further passing through the elastic member and the forward end of the support pin being inserted in the coil member.

The support member may include a support projection protruding towards the opening end of the casing in the axial direction of the casing, the support projection being inserted in the coil member.

The elastic member and the coil member may be in contact with each other through an annular spacer having a smaller diameter than the internal diameter of the casing.

The elastic member may be a coil spring having the diameter smaller than the internal diameter of the cap member and greater than the external diameter of the magnetic member, one end of the coil spring being in contact with the inner surface of the dome shape cap end of the cap member and the other end being in contact with one end of the coil member.

The elastic member may be a conical coil spring whose diameter is gradually reduced from the coil member side to the opening end side of the casing, one end of said conical coil spring being in contact with the end of the magnetic member and the other end being in contact with one end of the coil member.

The conical coil spring may be held so as to be compressed until the same thickness as the wire diameter of the coil spring.

The cap member may further include holding means for engaging with the internal surface of the casing so that the dome shape cap end of said cap member is limited to protrude outwards more than a predetermined length from the opening end of said casing.

The cap member may further include holding means for engaging with the support member so that the dome shape cap end of said cap member is limited to protrude outwards more than a predetermined length from the opening end of said casing.

The support member may include one end which is in contact with the coil and a holder section for holding a circuit board on which electronic components and circuit are mounted, said holder section being extended from the opposite surface of said end along the axis of the casing.

A stylus pen for a coordinate data input device may comprise:

a pen casing whose first inner space near one end includes the pointing unit as set forth in claim 1, and the second inner space near the other end includes a core unit, the forward end of which is protruded through an opening formed in the other end;

a variable capacitor which supports the core unit, the capacitance of said variable capacitor being varied in response to the pressure applied to the core unit; and a coil for constituting a resonant circuit in combination with the variable capacitor.

The above described constitution can provide a pointing unit for a stylus pen which has a low pen pressure characteristic and a sufficient stroke length with the minimum number of components and an easy assembly.

Especially, in the pointing unit according to the above described constitution, an elastic member is installed in a cap member and a magnetic member is installed in the elastic member so that the stylus pen can be provided with a low pen pressure characteristic and a sufficient stroke length.

Furthermore, since the above described pointing unit uses a conical coil spring which has a relatively short stroke, the stylus pen using this pointing unit can be provided with superior pressure sensitivity.

These and other objects, features and advantages of the invention will become more apparent upon a reading of the following detailed specification and drawings.

DETAILED DESCRIPTION OF THE PREFERRED EMBODIMENT

Figure 2:
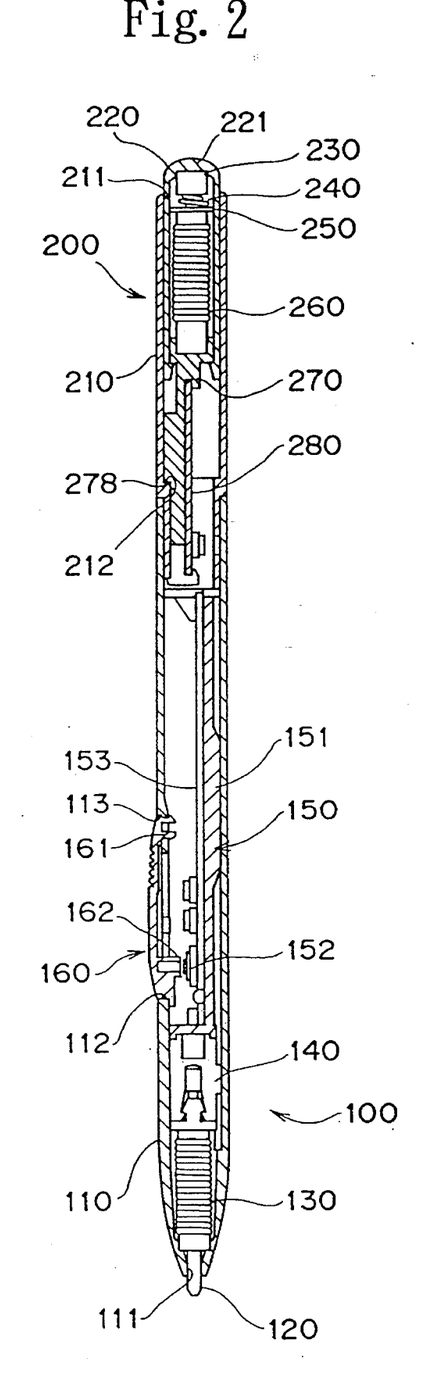
FIG. 2 is a vertical sectional view showing a stylus pen including a preferred embodiment of pointing unit according to the present invention.
Figure 3A:
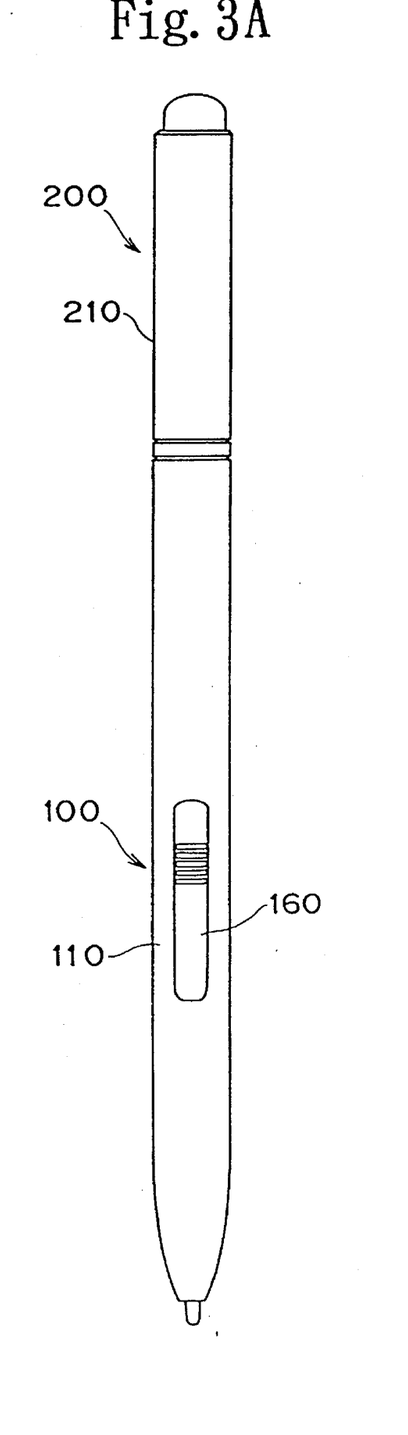
FIG. 3A and FIG. 3B are schematic illustrations showing the external appearance of the stylus pen as shown in FIG. 2.
Figure 3B:
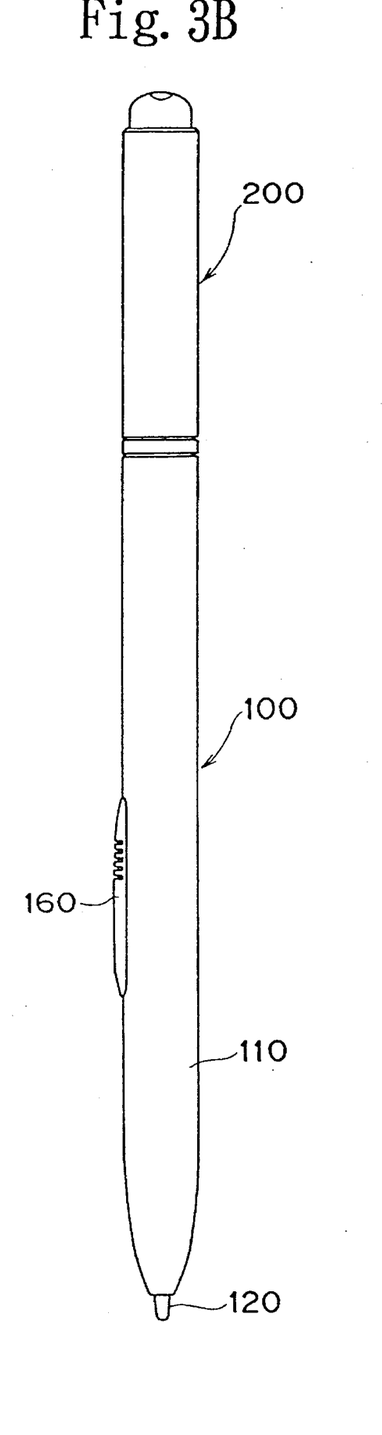

The present invention will be understood by discussing some preferred embodiments in conjuction with the accompanying drawings. FIG. 2 shows a vertically sectional view showing a stylus pen which includes a pointing unit according to one preferred embodiment of the present invention. FIG. 3A and FIG. 3B show external appearances of the stylus pen which includes two sections, a front section for a pen unit 100 and a rear section for an eraser unit 200. Hereinafter, "front end" represents the lower end and "rear end" represents the upper end in the drawings. The pen unit 100 has an external casing 110 formed in a cylindrical hollow member made of non-metal material such as synthetic resin. The external casing 110 is designed to have a similar shape to commonly used writing gears such as pencils, ball point pens, and the like from the view point of the user's handling facility. Therefore, the casing 110 has a tapered forward end with a front opening 111 through which a core member 120 partially protrudes. The external casing 110 further contains a coil unit 130 arranged around the core member 120, a pen down swtich unit 140 for receiving the rear end of the core member 120, and an electronic component unit 150.

The core member 120 is formed substantially rod-shaped with a round point at the front end, and is detachably assembled with the coil unit 130. The coil unit 130 includes a ferrite core having a through hole through which the core member 120 can be passed, and a coil member which is a litze wire having a lower value of high frequency resistance wound around the ferrite core. The pen down switch unit 140 includes a variable capacitor which associates with the coil unit 130 to constitute a resonant circuit. The capacitance of the variable capacitor is varied in response to the pressure of the rear end of the core member 120. The pen down swtich unit 140 can be selected from conventional commonly used devices. One preferable example is shown in Japanese Patent Application Open-Publication No. 4-96212/1992, previous application by the same applicant. However, the present invention is not limited to this device, and any conventional switches actuating On and Off operations can be also used. The electronic component unit 150 includes an elongated plate 151 extendingly located in the rear space of the pen down switch unit 140. On the elongated plate 151 there is a switching member 152 for providing various switching information and a printed circuit board 153 assembled with additional electronic components such as coil or capacitor which is electrically connected to or disconnected from the resonant circuit in response to the switching operation of the switching member 152.

The external casing 110 further includes a side switching member 160 for actuating the switching member 152. This side switching member 160 is supported by a supporting point 161 which is mechanically engaged with a supporting opening 113 formed adjacent to a side opening 112 formed in the external casing 110. Although this side switching member 160 is normally urged outwards by its own elastic force, it will be easily deformed inwards by external pressure. Since the side switching member 160 has a contact section 162 protruding inwards, the contact section 162 will press the switching member 152 thereby performing its switching operation.

The above described pen unit 100 is one of the non-stroke type stylus pens whose core member 120 is not moved in response to pen pressure. But the capacitance of the variable capacitor of the resonant circuit will be varied in response to pen pressure, so that the change of this resonant state will represent pen down operation.

Figure 4:
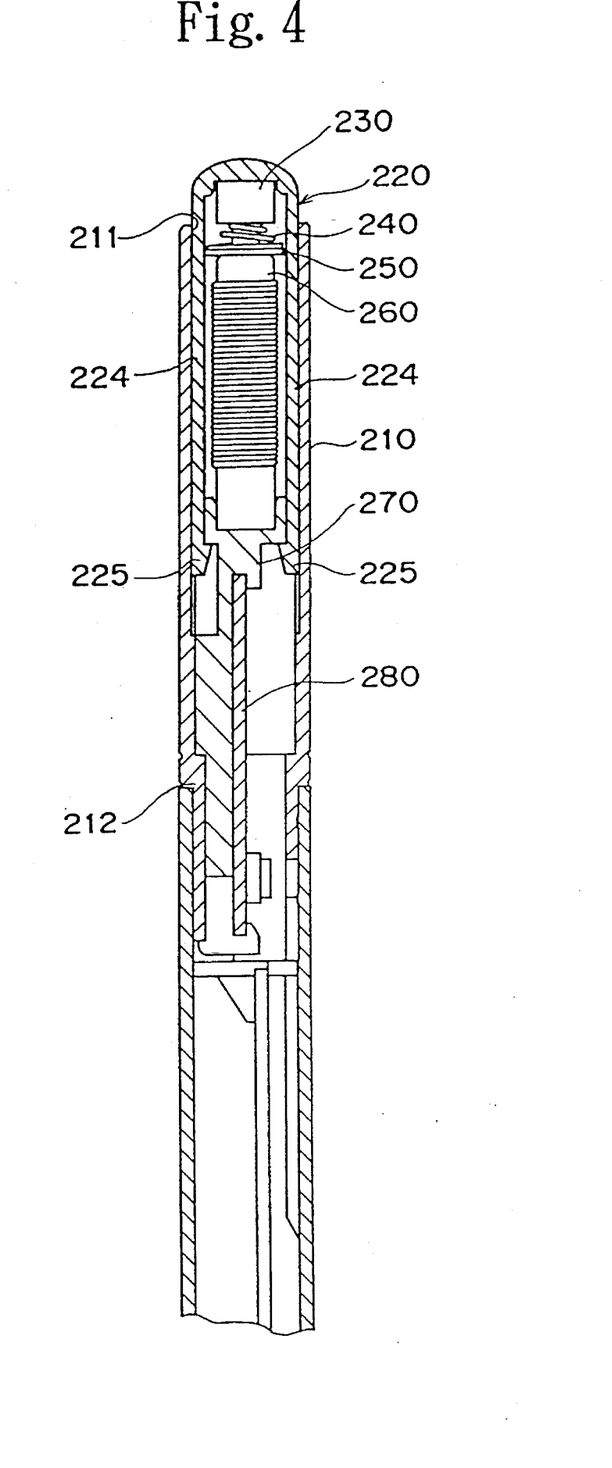
FIG. 4 is an enlarged partially sectional view of the stylus pen shown in FIG. 2.

On the other hand, the eraser unit 200 at the rear end of the stylus pen is shown in FIG. 4 which is a partially enlarged view of the rear section of the above described stylus pen. In detail, the rear end of the external casing 110 is engaged with a part of rear end casing 210 which is formed in a cylindrical shape similar to the external casing 110. The free end of this rear end casing 210 is provided with an opening 211 in which a cap member 220 is inserted. This cap member 220 is also formed in a cylindrical shape similar to the rear end casing 210. In the inner space defined by the rear end casing 210 and the cap member 220, a cylindrical magnetic member 230, a conical coil spring 240, an annular spacer 250, a coil unit 260, a support member 270 and a circuit board 280 are arranged.

Figure 5A:
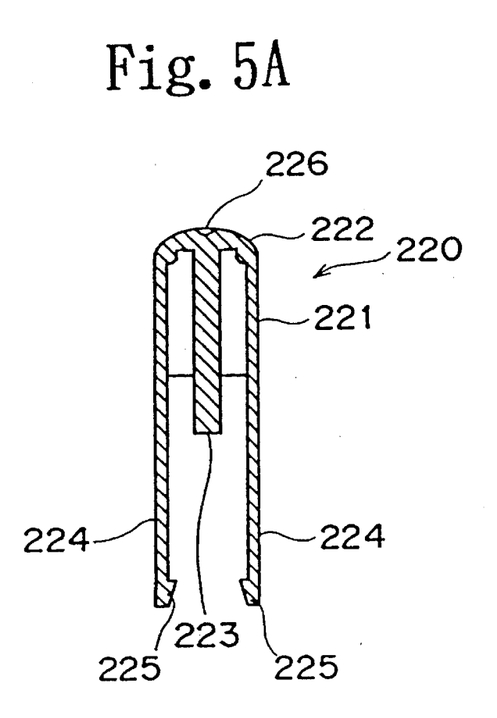
FIG. 5A is a sectional view showing a cap member of the stylus pen shown in FIG. 2.
Figure 5B:
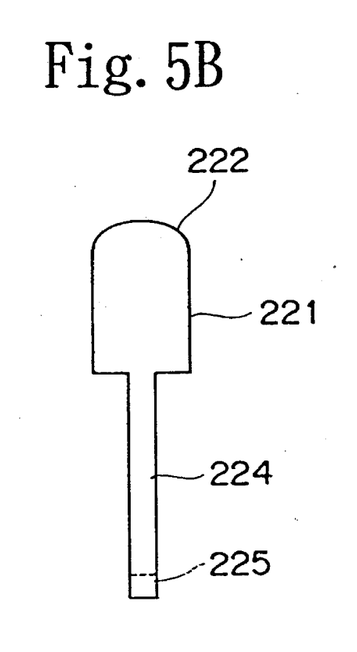
FIG. 5B is a schematic illustration showing a cap member of the stylus pen shown in FIG. 2.

As shown in FIG. 5A and FIG. 5B, the cap member 220 includes a cylindrical main body 221 made of synthetic resin or plastic material, and a cap end 222 formed in a dome shape covering one opening of the main body 221. The cap end 222 is provided with a support pin 223 which is inwardly protruding from the inner surface of the cap end 222 in the axial direction of the main body 221. Also the main body 221 is additionally provided with a pair of legs 224 extending from the free end of the main body 221. The end of each leg 224 is formed with a hook 225. Furthermore, the cap end 222 has a dimple 226 formed in the center of its external surface.

Figure 6A:
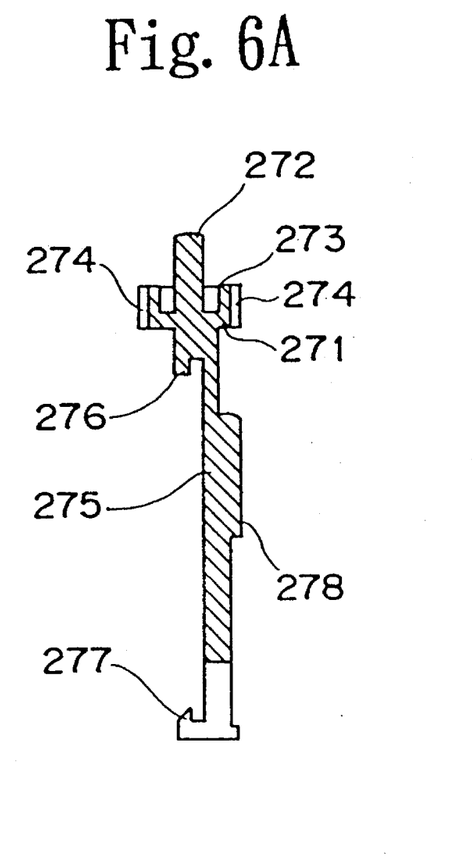
FIG. 6A is a sectional view showing a support member which is a part of the stylus pen as shown in FIG. 2.
Figure 6B:
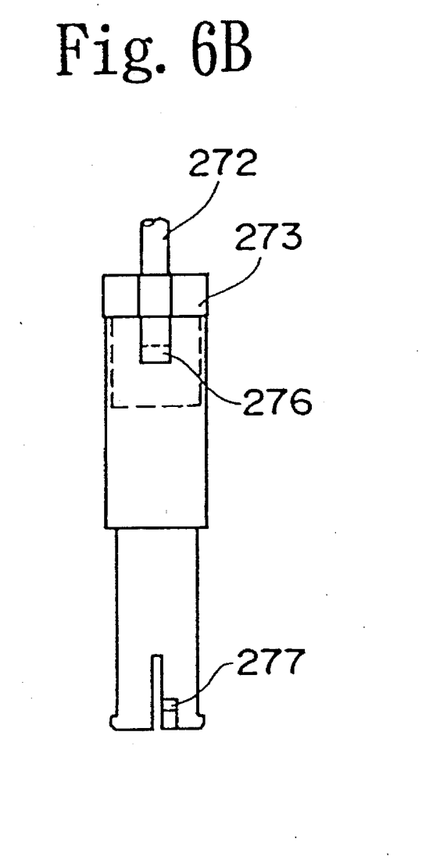
FIG. 6B is a schematic illustration showing a side appearance of the support member as shown in FIG. 6A.
Figure 6C:
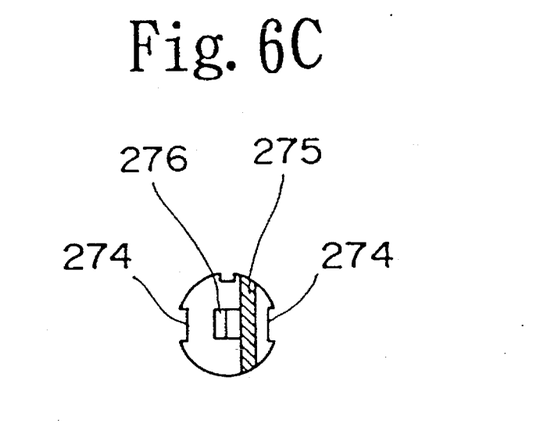
FIG. 6C is a schematic illustration of a plane view of the support member as shown in FIG. 6A.

As shown in FIG. 6A to FIG. 6C, the support member 270 has an upper end 271, a support projection 272 protruding upwards from the upper end 271, an annular flange 273 formed around the upper end 271, and a pair of grooves 274 formed in the annular flange 273 to receive the legs 224 of the above described cap member 220. The support member 270 further includes a holder section 275 for holding the circuit board 280, a pair of pawls 276 and 277 for holding the circuit board 280 therebetween, and a protruding section 278 which is in contact with a stepped section 212 formed in the internal surface of the casing 210 so that the support member 270 is prevented from moving in the front direction; i.e. the reverse direction of the opening 211 of the casing 210.

In this embodiment, the magnetic member 230 is a cylindrical ferrite core through which the support pin 223 is inserted to hold it. The coil unit 260 is made of the same material as the coil unit 130 used in the above described pen unit 100. The support pin 223 is inserted within one end of the coil unit 260 and the other end is received by the recess defined between the support projection 272 and the flange 273 of the support member 270.

Figure 7A:
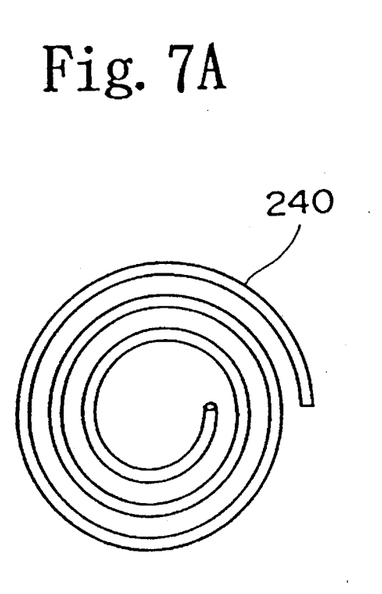
FIG. 7A and FIG. 7B are schematic illustrations showing a conical coil spring.
Figure 7B:
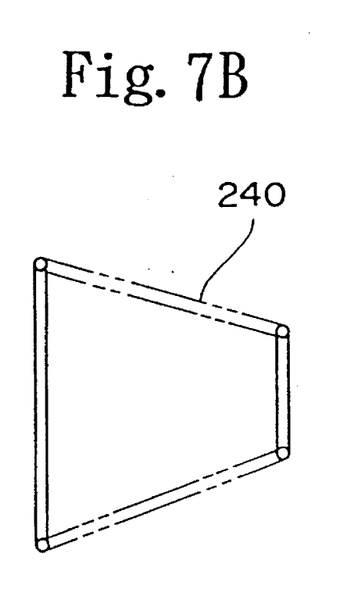

The conical coil spring 240 and the annular spacer 250 are interposed between the magnetic member 230 and the coil unit 260 which are also held by the cap member 220 and the support member 270 so that the support pin 223 passes through the conical coil spring 240 and the annular spacer 250. As shown in FIG. 7A and. FIG. 7B, this conical coil spring 240 is formed in such a manner that spring diameter is gradually reduced from the coil unit 260 side to the magnetic member 230. This conical coil spring 240 can be remarkably compressed. In other words, the height of the spring can approach a single wire diameter of the coil because coils do not physically interfere when the coils are compressed.

As shown in FIG. 4, the smaller diameter end of the coil spring 240 is in contact with the bottom end of the magnetic member 230 and the greater diameter end is in contact with the upper end of the coil unit 260 through the annular spacer 250. The coil spring 240 is normally kept in a slightly compressed state. In order to generate this compressed state, the cap member 220 and the support member 270 sandwich the magnetic member 230, the conical coil spring 240, the annular spacer 250 and the coil unit 260, and then the hooks 225 of the legs 224 of the cap member 220 are engaged with the upper ends 271 of the support member 270 so that the cap member 220 and the support member 270 are subjected to the bias force of the coil spring 240. Although this embodiment shows the cap member 220 engaged with the support member 270, the cap member 220 may be engaged with the internal surface of the rear end casing 210.

The annular spacer 250 is formed in an annular-shaped disc plate for stabilizing the contact between the conical coil spring 240 and the coil unit 260. The displacement distance and pen pressure characteristic of the cap member 220 may be varied according to the thickness of the annular spacer 250.

The circuit board 280 includes some electronic parts such as a capacitor for the resonant circuit with the coil unit 260. This circuit board 280 is engaged with the pawls 276 and 277 of the support member 270 so that the board 280 is held on the holder section 275 of the support member 270.

In such a constituted eraser unit 200, when the cap member 220 is subjected to pen pressure, the cap member 220 is moved inwards along the rear end casing 210 and then the magnetic member 230 also gets closer to the coil unit 260. This results in varying the inductance of the resonant circuit. In detail, as the magnetic member 230 gets closer to the coil unit 260, the phase of inductance is turned towards the negative side (the phase is delayed), thereby lowering the resonant frequency. This lowered resonant frequency is detected by the coordinate data input device. For example, when the cap member 220 is varied from the pressure free state to the completely depressed state (under the pressure of 120 g), the resonant circuit may be predetermined to vary the phase from +60° to −60°.

Since the above described embodiment employs two units providing different pen pressure characteristics; that is, a non-stroke type pen unit with a hard pen pressure characteristic and a stroke type eraser unit with a soft pen pressure characteristic, this embodiment makes the input operation of the stylus pen free from or have less mistakes. Especially, the eraser unit of the above described embodiment has a sufficient stroke length and a linearity of operation force so that this will realize smooth and reliable operation. It is possible to act the eraser unit as the second input pen unit.

Furthermore, since the above described stylus pen employes the compact and light weight eraser unit, the present invention can provide the stylus pen with a center of gravity existing in the pen unit without extending the whole length of the stylus pen. For example, the eraser unit 200 has a stroke length of 1 mm or more, but the eraser unit 200 is shorter and lighter than the pen unit 100. This advantage is realized due to the conical coil spring. Since the coil spring is used for the elastic member, its spring constant can be easily determined. This means that the pen pressure characteristic can be also easily determined. In comparison with the case of employing a rubber for the elastic member, the conical coil spring can linearly change the displacement of its stroke due to the load applied to this coil spring. Additionally, as described above, the annular spacer can freely control the variation range (D range) of phase (frequency) by adjusting the thickness of the spacer.

Figure 8:
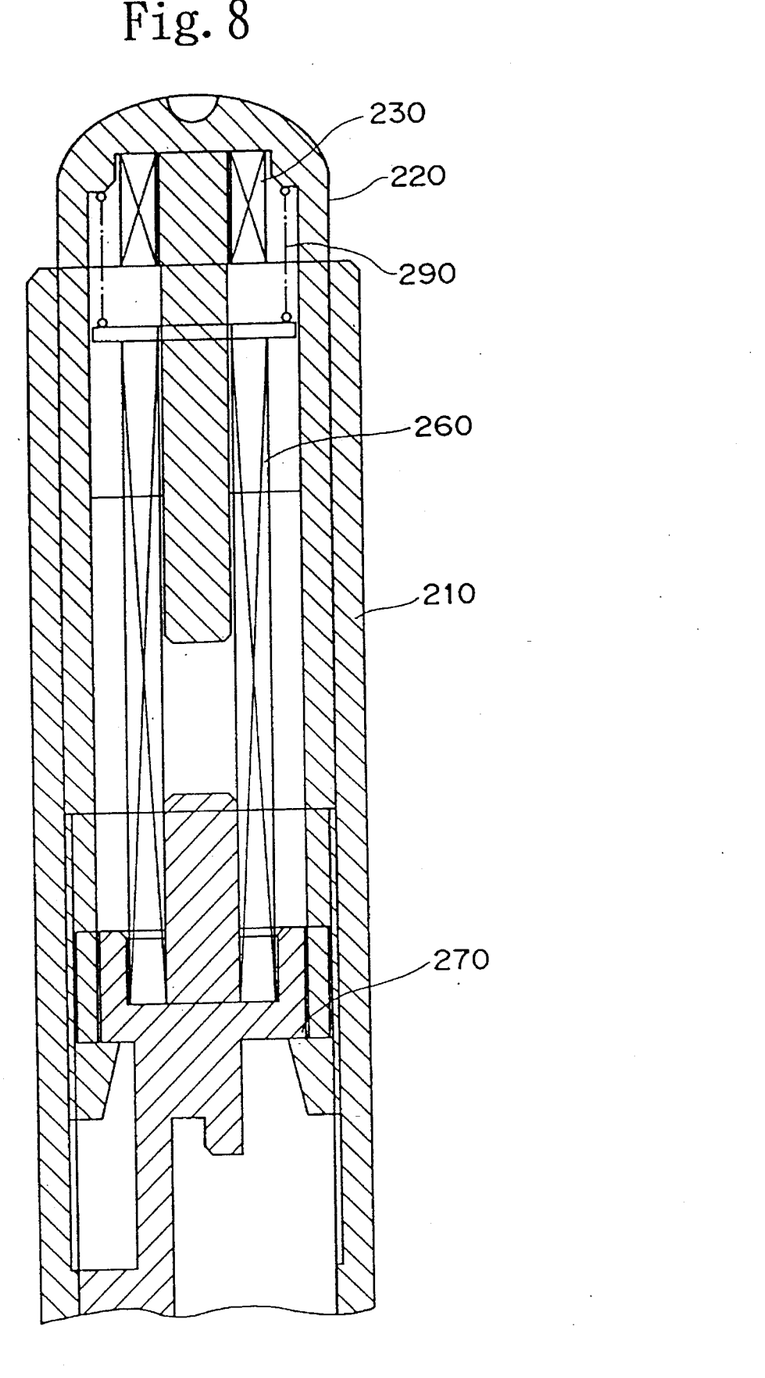
FIG. 8 is an enlarged partially sectional view showing another embodiment of the stylus pen according to the present invention.

Referring to FIG. 8, there is shown another embodiment of eraser unit wherein an ordinarily used coil spring is used for the elastic member. This embodiment has the same composition and constitution as the previously described embodiment, except for the coil spring and thus the same or corresponding components are represented by the same number and so the explanation need not be repeated. In this embodiment, a normal type coil spring 290 is arranged instead of the conical coil spring 240. This normal coil spring 290 has a diameter smaller than the inner diameter of a cap member 220 and greater than the external diameter of a magnetic member 230. One end of the spring is in contact with the inner end of the dome shape cap member 220 and the other end is in contact with an annular spacer 250. The magnetic member 230 is fixed to the inner surface of the cap member 220 by adhesive material or the like.

This embodiment provides essentially the same effects as the previously described embodiment except for only the demerit caused by the magnet member 230 installed in the coil spring 290. In detail, when the coil spring 290 is made of an electric conductive material such as stainless steel, the AC magnetic flux is cancelled by eddy-current loss of the coil spring. This cancellation is known as the shield effect which results in reducing the readable height of the coordinate data input device associated with this stylus pen. This demerit will be avoided by using non-conductive material such as ceramics for the coil material.

This embodiment may also employ an elastic rubber instead of the coil spring 290. However, in this case, the resulting demerits are such that when the elastic rubber has the same dimension as the coil spring 290, a sufficient stroke can not be formed. Conversely, when the elastic rubber has a low hardness to provide a soft pen pressure characteristic, this soft rubber will be too deformed to stabilize the initial phase.

Although the above described embodiments employ variable capacitor type pen unit 100, the present invention is not limited to this type unit. Furthermore, in the above described embodiments, the stylus pen is combined of the pen unit casing and the eraser unit casing, but it may be integrally formed in a single casing.

Given the above explanation, the present invention can provide a simple, light and compact positioning unit which allows improvement in assembling work and manufacturing cost.

As many apparently widely different embodiments of this invention may be made without departing from the spirit and scope thereof, it is to be understood that the invention is not limited to the specific embodiments thereof except as defined in the appended claims.

What is claimed is:

1. A pointing unit adapted for a stylus pen, comprising:
   a casing formed in a substantially cylindrical shape;
   a support member installed in the interior of the casing, the support member being limited to move in the reverse direction of the opening end of the casing;
   a cap member being located close to the opening end of the casing and formed in a cylindrical shape with a dome shape end protruding in the outward direction of the opening end by a predetermined length therefrom and the external diameter being slightly smaller than the internal diameter of the casing, the cap member being limited to move from the predetermined position in the outward direction of the opening end and on the contrary movable freely sliding in the inward direction;
   a magnetic member made of magnetic material, arranged close to the inner surface of the dome shape end of the cap member;
   a coil member including a magnetic core, interposed between the cap member and the support member; and
   an elastic member arranged in a narrow space defined between the coil member and the inner surface of the dome shape end of the cap member to urge said cap member in the outward direction with respect to the coil member so that the dome shape end of the cap member is defined at the predetermined position protruding some length from the opening end of the casing.

2. The pointing unit as set forth in claim 1 further comprising a capacitor electrically connected to the coil member; the capacitor and coil member constitute a resonant circuit whose oscillating state is varied in response to the inward movement of the cap member against the urging force by the elastic member.

3. The pointing unit as set forth in claim 1 capable of performing a positioning operation on a sensor plate including multiple sensor coils arranged parallel to each coordinate axial direction of a coordinate data input device through the dome shape end of the cap member.

4. The pointing unit as set forth in claim 1, wherein the cap member includes a support pin which is protruded inwardly from the inner surface of the dome shape cap end in the axial direction of the cap member, and the magnetic member formed in an annular shape through which the support pin is inserted, the support pin further passing through the elastic member and the forward end of the support pin being inserted in the coil member.

5. The pointing unit as set forth in claim 1, wherein the support member includes a support projection protruding towards the opening end of the casing in the axial direction of the casing, the support projection being inserted in the coil member.

6. The pointing unit as set forth in claim 1, wherein the elastic member and the coil member are in contact with each other through an annular spacer having a smaller diameter than the internal diameter of the casing.

7. The pointing unit as set forth in claim 1, wherein the elastic member is a coil spring having the diameter smaller than the internal diameter of the cap member and greater than the external diameter of the magnetic member, one end of the coil spring being in contact with the inner surface of the dome shape cap end of the cap member and the other end being in contact with one end of the coil member.

8. The pointing unit as set forth in claim 1, wherein the elastic member is a conical coil spring whose diameter is gradually reduced from the coil member side to the opening end side of the casing, one end of said conical coil spring being in contact with the end of the magnetic member and the other end being in contact with one end of the coil member.

9. The pointing unit as set forth in claim 8, wherein the conical coil spring is held so as to be compressed until the same thickness as the wire diameter of the coil spring.

10. The pointing unit as set forth in claim 1, wherein the cap member further includes holding means for engaging with the internal surface of the casing so that the dome shape cap end of said cap member is limited to protrude outwards more than a predetermined length from the opening end of said casing.

11. The pointing unit as set forth in claim 1, wherein the cap member further includes holding means for engaging with the support member so that the dome shape cap end of said cap member is limited to protrude outwards more than a predetermined length from the opening end of said casing.

12. The pointing unit as set forth in claim 1, wherein the support member includes one end which is in contact with the coil and a holder section for holding a circuit board on which electronic components and circuit are mounted, said holder section being extended from the opposite surface of said end along the axis of the casing.

13. A stylus pen for a coordinate data input device comprising:
   a pen casing whose first inner space near one end includes a pointing unit, and the second inner space near the other end includes a core unit, the forward end of which is protruded through an opening formed in the other end;
   a variable capacitor which supports the core unit, the capacitance of said variable capacitor being varied in response to the pressure applied to the core unit; and
   a coil for constituting a resonant circuit in combination with the variable capacitor.

* * * * *